United States Patent Office 3,741,906
Patented June 26, 1973

3,741,906
HINDERED PHENOXY RADICALS
William H. Starnes, Jr., Austin, Tex., assignor to Esso Research and Engineering Company
No Drawing. Filed Dec. 17, 1971, Ser. No. 209,447
Int. Cl. C09k 3/00
U.S. Cl. 252—182                                    7 Claims

ABSTRACT OF THE DISCLOSURE

Hindered phenoxy radicals are generated by dissolving 3,3′,5,5′ - tetra-t-butyl-1,1′-dichloro[bi-2,5-cyclohexadien-1-yl]4,4′-dione in a suitable solvent such as benzene. The so generated radicals may be reacted with a reactive substrate such as 2,6-di-t-butyl-4-benzylphenol.

BACKGROUND OF THE INVENTION

(1) Field of the invention

The present invention is directed to hindered phenoxy radicals. More particularly, the invention is concerned with a method of generating hindered phenoxy radicals. In its more particular aspects the invention is concerned with hindered phenoxy radicals which do not readily react with free oxygen-containing gas and which may thus be used in reaction with a suitable substrate in the absence of an inert atmosphere.

(2) Prior art

Hindered phenoxy radicals are known to be capable of reacting with a variety of organic substrates in a highly selective manner. However, the chemistry of these radicals has not been fully exploited because of certain difficulties involved in their preparation and subsequent use. Heretofore, such radicals (e.g., I and II) have usually been prepared by oxidizing the corresponding phenols with inorganic oxidants such as basic

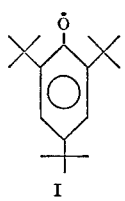

I

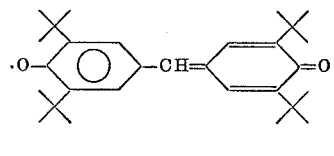

II ferricyanide solution, lead dioxide, silver oxide, etc. Unfortunately, in order to use the radicals in subsequent reactions, it is usually necessary to separate them from the inorganic materials remaining after their preparation. Elaborate and complicated setups are required for both the preparation and separation steps, since both of these operations must be carried out in an inert atmosphere in order to prevent destruction of the radicals by air oxidation. Furthermore, even in the absence of air, hindered phenoxy radicals are known to undergo slow decomposition on standing (in both the solid state and in solution); thus the radicals must be used immediately after preparation if decomposition by-products are to be avoided.

The foregong problems may be overcome by providing a substance stable to storage in the solid state, which is capable of forming hindered phenoxy radicals when put into solutions; formation of such solutions has not been known heretofore and therefore the present invention is new, useful and unobvious.

The following listed references were considered in connection with this invention:

Chemical Abstracts:
53: 8046e
54: 24530d
53: 2142d

U.S. patents:
2,785,188
2,794,051
2,940,988
3,316,304
3,271,449

British patent:
263,163

SUMMARY OF THE INVENTION

The present invention may be briefly described and summarized as hindered phenoxy radicals and a method of making them by dissolving 3,3′,5,5′-tetra-t-butyl-1,1′-dichloro-[bi-2,5-cyclohexandien-1-yl]4,4′-dione (III) in a suitable solvent. This compound yields the radical IV in a suitable solvent.

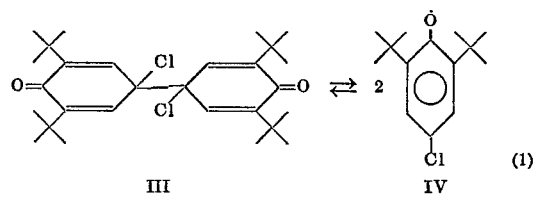

III                        IV                (1)

SOLVENTS

Solvents suitable in the practice of the present invention include certain liquid monocyclic aromatic hydrocarbons, such as benzene and t-butylbenzene, halogenated aromatics such as chlorobenzene, bromobenzene, and o-dichlorobenzene, and other substituted aromatics such as methyl benzoate, benzonitrile and nitrobenzene. Deuterated benzene may be used, as well as carbon tetrachloride, and aliphatic hydrocarbons such as neopentane and n-heptane. Other solvents which do not readily react with radical IV may also be employed.

The solvents are used in an amount sufficient to dissolve the compound III. Usually amounts of compound III to solvent in molar equivalent ratios of 1:1 to about 1:1000 may be employed with a preferred amount being in the molar equivalent ratio of about 1:10 to 1:100. Good results are obtained at a molar equivalent ratio of about 1:50.

PRODUCTION OF HINDERED PHENOXY RADICALS

Compound III shown in Equation 1 is a solid and can be stored for indefinite lengths of time without decomposition at room temperature in air. The compound may be produced in quantitative yield by oxidizing 2,6-di-t-butyl-4 chlorophenol (V) with basic ferricyanide solution. If desired, III may be recrystallized from solvents which are not particularly susceptible to attack by hindered phenoxy radicals such as IV. However, crude III contains only traces of impurities and is most conveniently used without further purification. At room temperature in deuterated benzene or CCl₄ solution, the nmr spectrum of III shows only minimal paramagnetic line broadening; thus the equilibrium constant for Equation 1 must lie far to the left under these conditions. Nevertheless, the concentration of radical IV is high enough under such circumstances to permit rapid reactions with reactive substrates. Thus, addition of a benzene solution of phenol VI (1 molar equivalent) to a benzene solution of III (1 molar equivalent) leads to the rapid and essentially quantitative formation of quinone methide VII and phenol V (Equation 2). This result clearly shows that III is, indeed, a source of hindered

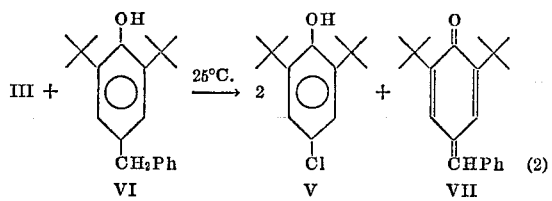

phenoxy radicals in solution.

Many reactions of compound III may be carried out without using an inert atmosphere. For example, radical IV shown in Equation 1 is generated in the presence of a reactive substrate by adding compound III to a solution of the substrate in a suitable solvent. Para-chlorinated phenoxy radicals such as IV are less susceptible to air oxidation than are similar radicals which do not contain chlorine.

The present invention is thus quite useful. Hindered phenoxy radicals are produced by adding compound III to a solvent to form a solution. Many new reactions are thus made possible, and known reactions of such radicals are greatly facilitated. For example, synthesis (without use of an inert atmosphere) is now possible of new phenolic antioxidants for various oxidation-prone materials such as rubber, olefinic polymers, foodstuffs, petroleum fractions and the like.

The substrates which may be employed in the present invention include phenols, aromatic and aliphatic thiols, primary and secondary aromatic amines, oximes, and hydrocarbons containing benzylic or allylic C—H bonds. These substrates are usable in a molar equivalent ratio to compound III of about 1:1 to 100:1 with a preferred ratio of about 1:1 to 2:1. The reaction of the hindered phenoxy radical is of course carried out in solution. The general types of reaction of the substrates with the hindered phenoxy radicals of the present invention are summarized in chapter 7 of "Organic Chemistry of Stable Free Radicals" by A. R. Forrester, J. M. Hay, and R. H. Thompson (Academic Press, Inc., New York, N.Y., 1968). This text is incorporated herein by reference.

DESCRIPTION OF THE PREFERRED MODES AND EMBODIMENTS

This invention is further illustrated by the following examples:

Examples 1 and 2 describe methods of preparation for V and III which are much more satisfactory than the methods given in the prior art. Example 3 gives details of the reaction shown in Equation 2.

EXAMPLE 1

Preparation of 2,6-di-t-butyl-4-chlorophenol (V)

A mixture of 2,6-di-t-butylphenol (50.0 g., 0.242 mole) and sulfuryl chloride (49.1 g., 0.364 mole) was stirred overnight at 60° C. After cooling to room temperature, the mixture was dissolved in benzene, and the solution was washed with water and two 100-ml. portions of 5% aqueous sodium hydroxide. Evaporation of the dried organic phase afforded 57.9 g. (99%) of V, M.P. 75–78° C., which was shown by nmr analysis to contain only traces of impurities. Recrystallization of the product from aqueous methanol gave 48.8 g. (84%) of purified material, M.P. 80–80.5° C.

EXAMPLE 2

Preparation of 3,3′,5,5′-tetra-t-butyl-1,1′-dichloro[bi-2,5-cyclohexadien-1-yl]4,4′-dione(III)

A mixture of potassium ferricyanide (25 g., 0.076 mole), potassium hydroxide (5 g., 0.09 mole), water (200 ml.), and benzene (200 ml.) was prepared in an indented flask and degassed by bubbling with nitrogen while stirring vigorously. A similarly degassed solution of phenol V (10.00 g., 0.0415 mole) in benzene (50 ml.) was added, and stirring with introduction of nitrogen was continued for 30 min. After separation of layers, the organic moiety was washed repeatedly with saturated sodium chloride solution (final wash was neutral), dried, and evaporated. The residue, a pale yellow powder, had M.P. 158.5–161.5° C. and was shown by nmr analysis to contain 9.88 g. (99%) of III, together with a trace of benzene (the only detectable impurity). Two recrystallizations of the product from acetone gave pale orange prisms: M.P. 168–170° C. (unchanged by a further recrystallization from the same solvent). The infrared and ultra-violet spectra of the purified material were identical with the spectra reported for III in the literature, and the nmr spectrum of the material was also consistent with the structure assigned.

*Analysis.*—Calculated for $C_{28}H_{40}Cl_2O_2$ (percent): C, 70.13; H, 8.41; Cl, 14.8; molecular weight, 480. Found (percent): C, 70.23; H, 8.39; Cl, 14.6; molecular weight (in benzene), 493.

The structure of III was further confirmed by its facile conversion to the corresponding diphenoquinone upon treatment with mercury in refluxing benzene.

EXAMPLE 3

Reaction of dione III with 2,6-di-t-butyl-4-benzylphenol(VI)

A solution of VI (0.037 g., 0.12 mmole) in benzene-$d_6$ (0.5 ml.) was combined with a solution of III (0.060 g., 0.12 mmole) in the same solvent (0.5 ml.), and the nmr spectrum of the new solution was recorded at frequent intervals. The spectrum showed that a rapid reaction was occurring, and that phenol V and quinone methide VII were formed in very high yield (>95%) within 21.5 hr. The presence of V and VII was confirmed by VPC analysis and by comparing the infrared and nmr spectra of trapped VPC fractions vs. the spectra of authentic specimens.

The nature and objects of the present invention having been completely described and illustrated and the best mode and embodiment contemplated set forth, what I wish to claim as new and useful and secure by Letters Patent is:

1. Hindered phenoxy radicals comprising a solution of 3,3′,5,5′-tetra-t-butyl - 1,1′ - dichloro[bi-2,5-cyclohexadien-1-yl]4,4′-dione in a solvent selected from the group consisting of benzene, deuterated benzene, t-butyl benzene, chlorobenzene, bromobenzene, o-dichlorobenzene, methyl benzoate, benzonitrile, nitrobenzene, carbon tetrachloride, n-heptane and neopentane.

2. Hindered phenoxy radicals in accordance with claim 1 in which the solvent is benzene.

3. Hindered phenoxy radicals in accordance with claim 1 in which the solvent is employed in an amount at least sufficient to form the solution.

4. A method for generating hindered phenoxy radicals which comprises dissolving 3,3',5,5'-tetra-t-butyl-1,1'-dichloro-[bi-2,5-cyclohexadien-1-yl]4,4'-dione in a solvent selected from the group consisting of benzene, deuterated benzene, t-butyl benzene, bromobenzene, chlorobenzene, o-dichlorobenzene, methyl benzoate, benzonitrile, nitrobenzene, n-heptane, carbon tetrachloride and neopentane.

5. A method in accordance with claim 4 in which the solvent is benzene.

6. A method in accordance with claim 4 in which 2,6-di-t-butyl-4-benzylphenol is added in equal molar equivalents to the dione solution.

7. A method for generating hindered phenoxy radicals which comprises dissolving 3,3',5,5'-tetra-t-butyl-1,1'-dichloro-[bi-2,5-cyclohexadien-1-yl]4,4'-dione, in a solvent which does not react readily with the radical:

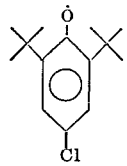

No references cited.

JOHN D. WELSH, Primary Examiner

U.S. Cl. X.R.

260—593, 592